United States Patent [19]

Galuschak et al.

[11] Patent Number: 4,599,803
[45] Date of Patent: Jul. 15, 1986

[54] HEADING INDICATOR AND METHOD OF USING

[75] Inventors: George Galuschak, Hasbrouck Heights; Richard J. Stomber, Wayne, both of N.J.

[73] Assignee: The Singer Company, Little Falls, N.J.

[21] Appl. No.: 66,702

[22] Filed: Aug. 15, 1979

[51] Int. Cl.⁴ .............................................. G01C 19/38
[52] U.S. Cl. ....................................... 33/301; 33/316; 33/324
[58] Field of Search ................. 33/324, 321, 322, 316, 33/317, 318, 301

[56] References Cited

U.S. PATENT DOCUMENTS 3,354,726  11/1967  Krupick et al.
3,739,480  6/1973  Hanusek et al. ........................ 33/324
3,894,341  7/1975  Kapeller ................................. 33/324

FOREIGN PATENT DOCUMENTS 153574  10/1963  U.S.S.R. ................................. 33/316

Primary Examiner—William D. Martin, Jr.
Attorney, Agent, or Firm—Thomas W. Kennedy

[57] ABSTRACT

A heading indicator is disclosed which utilizes a one degree of freedom platform stabilized by a two degree of freedom dry flexure gyro. The output of one of the sensitive axis is coupled through an amplifier to the corresponding torquer in the gyro and selectively through an another amplifier to the opposite torquer. The other sensitive axis output is coupled through an amplifier to the platform. The indicator initializes at true north and is then switched to a directional gyro mode.

1 Claim, 2 Drawing Figures

HEADING INDICATOR AND METHOD OF USING

BACKGROUND OF THE INVENTION

This invention relates to heading instruments in general and more particularly to a low cost instrument containing a visual display of heading for tanks.

The present low cost technique for providing heading information in tanks requires a magnetic sensor to initialize the system and a directional gyroscope for maintaining the alignment. In a system of this nature the visual read out of heading information is an indicator card mounted on the control panel which is servoed to a synchro on the directional gyroscope.

The primary disadvantage of this system is that it uses a magnetic sensor for alignment which can be affected by large iron or steel structures. In tanks for example, a turret would have to be in a fixed position during alignment in order to avoid degrading the accuracy of the system. Also the proximity of other armored vehicles at this time can introduce errors in the heading.

Another disadvantage of this system is that the components take up a considerable amount of space, something that is at a premium in tanks.

Some expensive devices have utilized a gyrocompassing function with the use of accelerometers and bubbles which in addition of increasing the cost have increased the overall complexity of the system.

It is an object of this invention to provide a low cost heading indicator which is insensitive to weak magnetic fields of ferrous structures proximate to the device.

It is another object of the invention to provide a low cost heading indicator that is smaller in volume than the presently used device.

Another object of the invention is to combine the functions of a gyrocompass and a directional gyro in a single device without the need for accelerometers or bubbles.

Another object of this invention is to provide a system that aligns itself to true North within 5 minutes, that is insensitive to magnetic anomalies and that can then be switched to a directional gyroscope mode to give heading indications.

It is another object of the invention to provide a low cost heading indicator with a direct gyro readout providing heading information.

SUMMARY OF THE INVENTION

These objects are attained in a low cost heading indicator which includes a single degree of freedom platform stabilized by a two degree of freedom gyroscope. A circuit is provided for initially utilizing the gyroscope in a gyrocompass mode thereby aligning the gyroscope to true North and then selectively utilizing the gyroscope as a directional gyroscope. This result is obtained by coupling one of the sensivitive axes of the gyroscope through an amplifier to the corresponding torquer, and selectively through an amplifier to the opposite torquer. The other sensitive axis of the gyro is coupled through an amplifier to the platform torquer. A 45 degree conically shaped compass card is mounted on top of the case of the gyroscope to provide direct gyro readout of heading information. The device uses the gyro rate capture current as a direct measure from North to drive the gyrocompass amplifier.

The advantages of the proposed system include its small size and the avoidance of magnetic devices or bubble sensor. Additionally, it is unnecessary to provide a servo mechanism to couple the gyroscope output to the readout device. The truncated conical compass card provides a heading display visable from either a horizontal or vertical position.

DETAILED DESCRIPTION OF THE INVENTION

Figure 1:
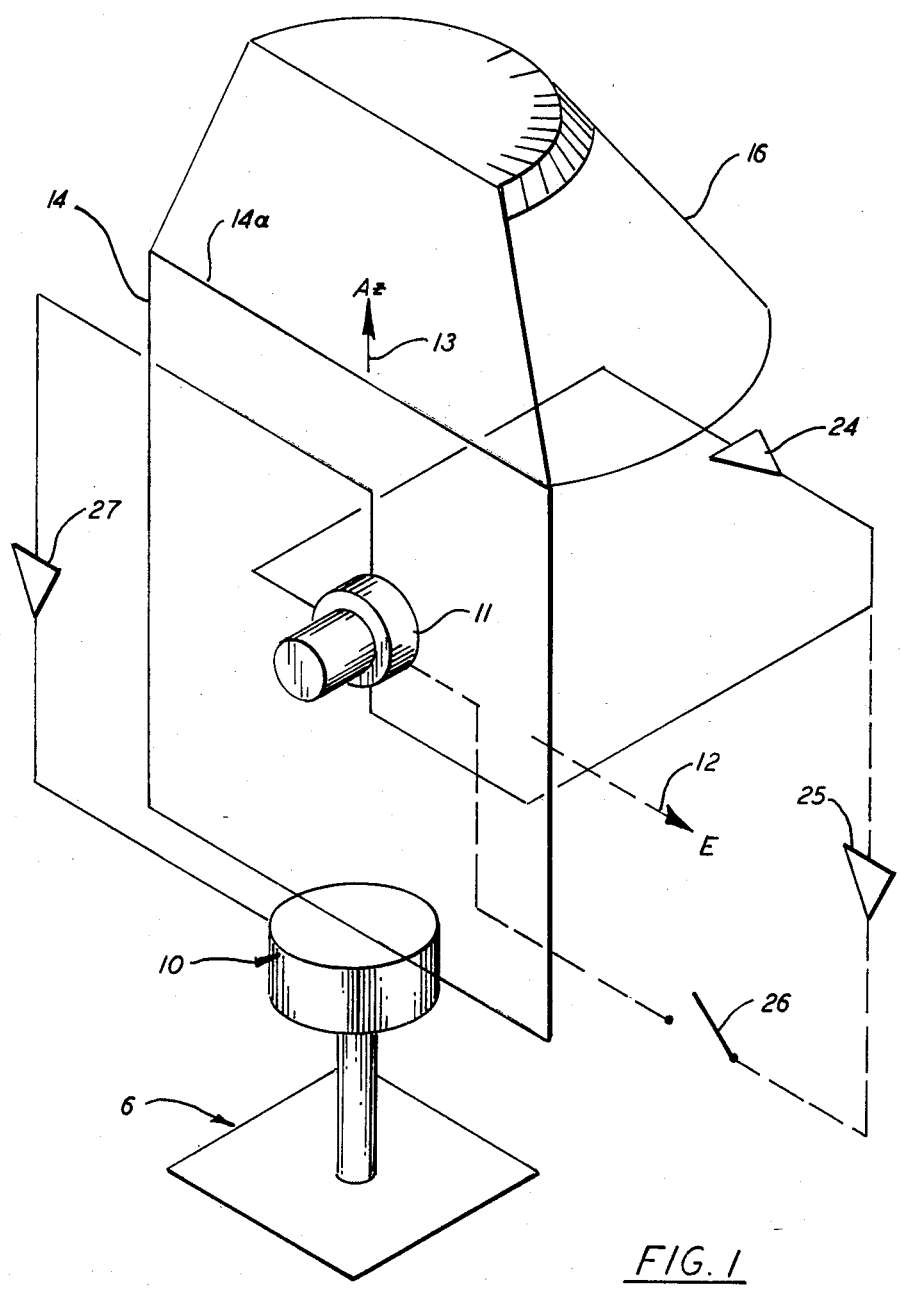
FIG. 1 is a perspective schematic view of the low cost heading indicator system of the present invention.

FIG. 1 is a perspective schematic view of indicator to be used in a tank. The indicator comprises a base 6 which supports a single degree of freedom platform 10, which is rotatable about a vertical axis (azimuth). The platform 10 is stabilized by a two degree of freedom dry flexure suspended gyroscope 11. The gyroscope 11 is oriented so that its two sensitive axes lie along the azimuth axis 13 and an east axis 12. The gyroscope 11 is mounted on the platform 10 and includes a case attached to an azimuth gimbal 14. To indicate heading, the system includes a truncated 45 deg. conically shaped compass card 16 which is mounted directly on azimuth gimbal 14. The invention overcomes the need of servo mechanisms by directly mounting the compass card on the gimbal. The conical shape of the compass card provides a visual display of heading when viewed from either the side or the top of the unit.

The gyroscope 11 includes a flywheel, the case 15, and a motor. The case 15 is mounted on the platform 10 and the flywheel is suspended within the case suspension. The motor maintains the flywheel rotating at a predetermined rate.

The gyroscope 11 also includes an east pickoff 19 (see FIG. 2) for sensing the relative rotation of the case about the east axis, an east axis torquer 20 for restoring movement about the east axis 12, an azimuth axis pickoff 21 to sense the relative rotation about the azimuth axis 13, and an azimuth axis torquer 22 for movement about the azimuth axis.

An azimuth gimbal torquer 23 is provided to rotate platform 10 about the azimuth axis.

Figure 2:
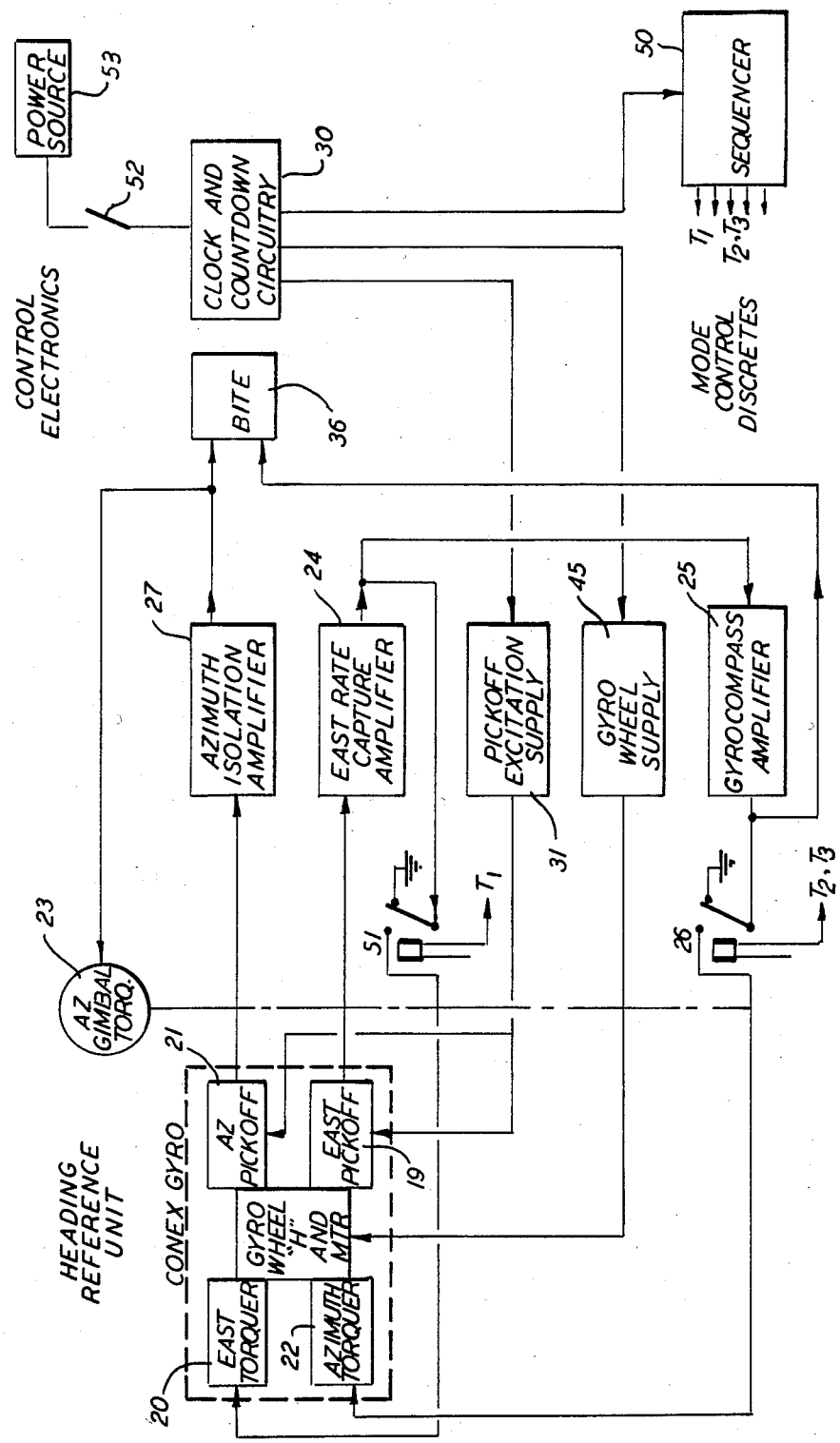
FIG. 2 is a functional block diagram of the system.

As shown in FIG. 2 the east axis pickoff 19 is coupled to the east axis torquer through a rate capture amplifier 24. The output of the rate capture amplifier 24 is provided to the azimuth axis torquer 22 through a gyrocompass amplifier 25. A mode relay 26 is disposed between the gyrocompass amplifier 25 and the azimuth axis torquer 22.

The azimuth axis pickoff 21 is coupled to the azimuth gimbal torquer 23 by means of an azimuth isolation amplifier 27 which causes the gimbal torquer to displace the gimbal to keep it aligned with the flywheel.

A clock and countdown circuitry 30 is connected to a pickoff excitation supply 31. The clock and countdown circuitry 30 includes a crystal oscillator clock which produces a DTL logic level square wave, and countdown logic which utilizes the clock input to produce a square wave for the input to the pick off excitation supply 31. The pickoff excitation supply 31 is an amplifier which utilizes the logic input to produce a stable sine wave with low distortion. This is achieved by combination of filtering and feedback. The sine wave excitation signal generated by the pick off excitation supply 31 is used to excite the east axis pickoff 19 and the azimuth axis pick off 21. The signal generated by the azimuth axis pickoff 21 is amplified by azimuth isolation amplifier 27, whose output drives the azimuth torquer 23. The azimuth isolation amplifier 27 contains a proportional gain channel and a parallel integral channel to achieve overall servo loop compensation with adequate gain and phase margin. The two signals are summed in an operational amplifier whose output drives an H bridge output circuit with the azimuth gimbal torquer 23 as the load, and a relay in series with the load is used to initially close the loop and also to open the loop when a BITE circuit 36 indicates a fault.

The BITE circuit 36 is a built in test equipment which basically checks the gimbal loop, which includes azimuth axis pickoff 21, azimuth isolation amplifier 27 and azimuth gimbal torquer 23; and the gyrocompass loop, which includes the east axis pick off 19, the east rate capture amplifier 24 the gyro compass amplifier 25 and the azimuth axis torquer 22. Once the initial system transients have been settled, the BITE circuits 36 are enabled. Normally both the gimbal loop and the gyrocompass loop are always at null, but if a large signal (approximately 10 volts DC) appears at either of these loop outputs for an extended time period (250 ms) the BITE circuit 36 issues a fault warning. In the case of a gimbal loop fault, the relay in series with the gimbal torquer is open.

The signal generated by the east axis pickoff is fed into the east rate capture amplifier 24 which in conventional fashion includes an AC pre-amplifier and a synchronous demodulator, coupled to the preamplifier to achieve quadrature rejection. Also included are operational amplifiers for integration and loop servo compensation. The next stage has a notch filter that uses an operational amplifier with resistor/capacitors in a parallel tee configuration to achieve high attenuation. The output stage of this loop is arranged as a current amplifier with feedback from a resistor in series with the east axis torquer 20. The loop gain is changed by shunting a load resistor in series with the east axis torquer 20.

The output from the east rate capture amplifier 24 is fed into a gyrocompass amplifier 25 through the mode relay 26. The gyrocompass amplifier feeds a power summing amplifier in a current feedback configuration in the gyrocompass mode. In the directional gyro mode the main input of the summing amplifiers is grounded while a correction signal of an azimuth gyro drift compensation may be fed into the summing amplifier input. Low drift operational amplifiers are utilized in this configuration to achieve the desired system accuracy. The output of the gyrocompass amplifier 25 is fed into the azimuth axis torquer 22 which is utilized to drive the flywheel about the azimuth axis. The output of the gyrocompass amplifier 25 is also coupled to BITE circuit 36 with which checks the signal in the same way as it checked the output of the azimuth isolation amplifier 27 above.

The clock and countdown circuitry 30 is connected to a gyro wheel supply 45 which counts down the logic signal from the clock and countdown circuitry 30 to produce an input to a logic countdown, that in turn produces 4 phases for the input signal to the gyro wheel supply. The gryro wheel supply 45 contains two transition H bridges that are driven by the gyro wheel supply input logic signals. The gyro wheel supply is coupled to the gyro motor. Each phase winding of the gyro motor is the load for the pair of H bridges. The excitation for the bridges is a single ended DC voltage. The input logic has frequency detection circuitry to detect loss of signal and prevent the possibility of damaging the motor.

The clock and countdown circuitry 30 provides a slip sync signal of which is used as the input signal to a sequencer 50. The sequencer utilizes the logic frequency to develop the following approximate times from additional countdown logic circuitry and relay drivers. T0=0, T1=30 seconds, T2=31 seconds, T3=300 seconds. At T0 the switch 52 is closed, activating the clock and countdown circuitry 30 and also energizing the gyroscope 11. The T1 timing signal turns on a capture loop relay 51 that closes the east rate capture loop, which includes the east pick off 19, the east rate capture amplifier 24 and the each torquer 20; and the gimbal isolation loop described above. At T2 the gyrocompass loop is closed by energizing the mode relay 26. At T3 the mode relay 26 is deenergized to open the gyrocompass loop and the BITE circuit is enabled. Any fault condition that exists after the BITE is enabled will keep the malfunction lamp illuminated. A power supply 53 utilizes 28 volt DC battery voltage as an input and utilizes pulse width modulation to achieve regulation and efficiency.

The operation of the system described above can be better understood by an explanation of some general principles of gyroscope physics and an example of the operation of the different modes.

At any local latitude, $\lambda$, the earth's rotational velocity, $W_e$, can be resolved into two components, a horizontal component $(W_H)$ and a vertical component $(W_V)$. The horizontal component of earth's rate lies in a plane which is perpendicular to local gravity. The vertical component of earth's rate lies in the same vertical plane as local gravity. This vertical plane is aligned in a north-south direction.

Consider the platform 10 with the azimuth gimbal 14 approximately vertical (FIG. 1). The two degrees of freedom gyro 11 is mounted on this gimbal 14. One axis of the gyro, the east axis, 12 is captured back on to itself through the east rate capture amplifier 24. The other axis, the azimuth axis 13, is captured to the platform 10 through the azimuth isolation amplifier 27.

The east rate capture amplifier 24 captures the flywheel to the case about the east axis 12. The azimuth isolation amplifier 27 captures the case to the flywheel about the azimuth axis 13.

Assuming that the base of the Heading Indicator is in a horizontal plane with the east axis at an initial value $\psi_{IN}$ from the East-West reference and the azimuth axis is vertical, then the heading reference system is not yet useful in providing a north reference since the east gyro axis is not aligned to its reference, namely East. The North reference is established through a gyrocompassing process which is defined to be complete when the east axis is orthogonal to earth's rate. This occurs when $\psi$ is zero; that is when the east axis is East.

For the purposes of following the gyrocompasing process assume that the azimuth gimbal is initially positioned such that the east axis is $\psi_{IN}$ degrees from East, $\psi \neq 0$. In this position the east axis pickoff will sense a component of horizontal earth's rate.

$$(W_H)(\text{Sin } \psi_{IN})$$

The gyro case will rotate about the east axis of the flywheel at this rate. The east rate capture amplifier 24 provides a signal to the east axis torquer 20 to move the flywheel so that it follows the case 15 and maintains the east axis pickoff 19 at zero.

A measure of the east gyro torquer signal is amplified and sent to the gyrocompass amplifier 25. The gyrocompass amplifier output signal is applied to the azimuth axis torquer 22 which displaces the flywheel with respect to the case about the azimuth axis 13. The azimuth axis pickoff 21 provides an electrical signal indicating a relative motion between the flywheel and the gimbal 14. The signal is processed through the azimuth isolation amplifier 27 and drives the azimuth gimbal torquer 23 so that the gimbal 14 follows the flywheel and maintains the azimuth axis pickoff 21 at zero. The direction that the azimuth gimbal rotates is such to reduce the value of $\psi$.

This process continues until east gyro pickoff 17 senses no component of horizontal earth's rate; that is $\psi=0$ which usually takes about 5 min. The system has then finished gyrocompassing.

After gyrocompassing is finished the system switches to the directional gyro (DG) mode. This is done by opening the loop between the east rate capture amplifier 24 and the azimuth axis torquer 22 with mode relay 26, and can be accomplished manually or with a sequencer.

The purpose of the DG mode is to maintain the alignment that was achieved during gyrocompassing while the vehicle is travelling. This is accomplished through the east rate capture amplifier 24 and the azimuth isolation amplifier 27 electronics previously described. The east rate capture amplifier 24 keeps the flywheel from being disturbed, by torquing the flywheel so that it can follow the gimbal under all types of base motion that the vehicle will impose on the system. The azimuth axis 13 maintains the North alignment. Any vehicle motion about azimuth that may disturb the gimbal is sensed by the azimuth axis pickoff 21. The aximuth axis pickoff 21 provides a signal to the azimuth gimbal torquer 23 which keeps the gimbal 14 captured to flywheel which is fixed in space providing the North reference.

What is claimed is:

1. A method of indicating heading comprising the steps of:
    disposing a single degree of freedom platform on a base so as to be rotatable about a vertical axis;
    suspending a two degree of freedom gyro, having a first and second sensitive axes, on said platform such that said second sensitive axis is aligned with said vertical axis;
    sensing rotation about said first sensitive axis;
    developing a first output proportional to the rotation about said first sensitive axis;
    sensing rotation about said second sensitive axis;
    developing a second output proportional to the rotation about said second sensitive axis;
    torquing said gyro about said first sensitive axis an amount proportional to said first output;
    torquing said gyro about said second sensitive axis an amount proportional to said first output for a predetermined amount of time; and
    rotating said platform an amount proportional to the second output.

* * * * *